(12) United States Patent
Fan

(10) Patent No.: US 10,360,745 B2
(45) Date of Patent: Jul. 23, 2019

(54) SMART LOCK FOR SHARED-RIDE BICYCLE AND MOBILE APP BASED CONTROL SYSTEM THEREOF

(71) Applicant: VBikes Technology LLC, Garland, TX (US)

(72) Inventor: Yongjin Fan, Hangzhou (CN)

(73) Assignee: VBikes Technology LLC, Garland, TX (US)

( * ) Notice: Subject to any disclaimer, the term of this patent is extended or adjusted under 35 U.S.C. 154(b) by 0 days.

(21) Appl. No.: 15/607,486

(22) Filed: May 27, 2017

(65) Prior Publication Data

US 2018/0350175 A1  Dec. 6, 2018

(51) Int. Cl.
| | |
|---|---|
| *B62H 5/00* | (2006.01) |
| *G07C 9/00* | (2006.01) |
| *G01S 19/24* | (2010.01) |
| *H04W 88/02* | (2009.01) |
| *B62H 5/20* | (2006.01) |

(52) U.S. Cl.
CPC ........... *G07C 9/00182* (2013.01); *B62H 5/00* (2013.01); *B62H 5/20* (2013.01); *G01S 19/24* (2013.01); *H04W 88/02* (2013.01); *G07C 2009/0019* (2013.01); *G07C 2009/00634* (2013.01)

(58) Field of Classification Search
None
See application file for complete search history.

(56) References Cited

U.S. PATENT DOCUMENTS

| | | | | |
|---|---|---|---|---|
| 5,408,212 A | * | 4/1995 | Meyers ..................... | B62H 5/20 340/426.28 |
| 7,726,160 B2 | * | 6/2010 | Gagosz .................... | B62H 3/00 211/5 |
| 7,898,439 B2 | * | 3/2011 | Bettez ...................... | B62H 3/00 194/205 |
| 8,678,205 B2 | * | 3/2014 | Mercat ..................... | B62H 3/02 211/5 |
| 9,134,994 B2 | * | 9/2015 | Patel ......................... | G06F 8/20 |
| 9,381,964 B2 | | 7/2016 | Haidak | |
| 2010/0313614 A1 | * | 12/2010 | Rzepecki ............... | B62H 5/145 70/233 |

FOREIGN PATENT DOCUMENTS

CN   ZL201310630670.7 B    7/2016

\* cited by examiner

*Primary Examiner* — K. Wong
(74) *Attorney, Agent, or Firm* — Timothy T. Wang; Ni, Wang & Massand, PLLC

(57) ABSTRACT

A smart lock for shared-ride and its control system comprising a smart lock body, a microcontroller, a close-range wireless communicator connected to the microcontroller. The microcontroller is connected to the mobile APP control end via wireless communication. The smart lock additionally has a mobile communication module, a lock controller and a lock actuator connected to the microcontroller. When the mobile APP control end sends an unlocking instruction, a close-range wireless communicator receives an unlocking signal, so that the lock controller controls a lock actuator for an unlocking action of the smart lock. The advantages of this utility model lie in its quick unlocking, high security and easy operation.

10 Claims, 3 Drawing Sheets

SMART LOCK FOR SHARED-RIDE BICYCLE AND MOBILE APP BASED CONTROL SYSTEM THEREOF

BACKGROUND

This utility model falls within the technical: field of smart locks, especially involving a kind of smart lock for shared-ride bicycle and its control system.

Shared-ride bicycle refers to shared-ride bicycle service, which is a new form of the sharing economy. To facilitate the sharing and exchange of bicycles, bicycles are usually locked with smart lock devices. At present, to unlock a smart lock device, usually an IC card or scanning a QR code is swiped. It is not convenient if the device is unlocked through the swiping of an IC card, as the user is likely to forget to take the IC card. If the device is unlocked through the scanning of a QR code, it is more convenient than swiping an IC card or some other methods; however, there are certain security risks associated with QR codes, and unlocking through QR code scanning is slow with a low success rate, which ma bring about poor unlocking experience to users.

To solve the above technical problem, people have been exploring for a long time, and have proposed a wide range of solutions. For instance, according to some Chinese patent literature, a kind of smart lock under mobile-APP-based control is disclosed [application No.: 201520649330.3]. It includes one smart lock, which is controlled by the user's cell phone remotely. The cell phone of the user is connected with the smart lock with 2G or 3G remote data. A control system is installed within the smart lock, which includes a control circuit. There is an execution module on the output and input end of the control circuit, and there is a face recognition module on the input end of the control circuit. There is a fingerprint recognition zone on the smart lock. The output end of the fingerprint recognition zone is connected to the input end of the control circuit. There is also a data receiving and dispatching module on the input and output end of the control circuit. This solution is characterized by its simple structure. The user can unlock only upon the fingerprint recognition both on the cell phone and on the smart lock. The user may also open a door remotely through the mobile APP. It is quite easy and convenient.

Though the foregoing solution has so many advantages, it still fails to solve the above technical problems, as is still well designed, cannot unlock quickly, and has a low unlocking success rate, etc.

SUMMARY

In one embodiment a smart lock for shared-ride bicycles comprises at least one of a smart lock body, a microcontroller coupled to the smart lock body, a close-range wireless communicator having a wireless module, the close-range wireless communicator is coupled to the microcontroller, wherein the close-range wireless communicator is coupled to a mobile APP control end via the wireless module, a mobile communication module coupled to the microcontroller, a lock controller coupled to the microcontroller and a lock actuator coupled to the microcontroller, wherein when the mobile APP control end gives an unlocking instruction, the close-range wireless communicator receives an unlocking signal, and the lock controller controls the lock actuator, unlocking the smart lock body.

In another embodiment a mobile-APP-based control system for a shared-ride bicycle, comprises at least one of a smart lock for the shared-ride bicycle, a mobile communication module connected to the smart lock via a wireless module, a mobile APP control end connected is the wireless module to one or more of a 2G, 3G, 4G and 5G mobile module network, a cloud server connected to the mobile communication module and the mobile module network and a close-range wireless communicator coupling the smart lock to the mobile APP.

DETAILED DESCRIPTION OF THE INVENTION

Figure 1:
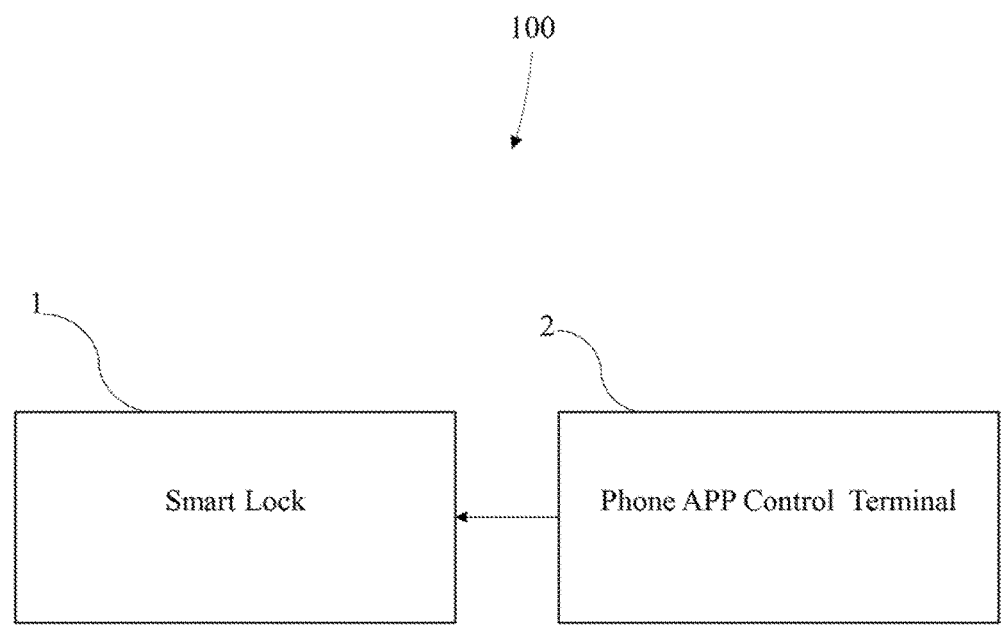
FIG. 1 is a frame schematic diagram provided by this utility model.

The purpose of this Utility Model is to provide a better designed smart lock for shared-ride bicycle under mobile-APP-based control that can be unlocked quickly with a high success rate.

Another purpose of this Utility Model is to provide a better designed smart lock for shared-ride bicycle under mobile-APP-based control for the foregoing problems.

To realize the foregoing purposes, the following technical solution has been adopted for this utility model: This smart lock for shared-ride bicycle under mobile-APP-based control includes a smart lock body. The smart lock body includes a microcontroller. A close-range wireless communicator is connected with the microcontroller, which is connected to the mobile APP control end via wireless communication. There is also a mobile communication module, a lock controller and a lock actuator connected with the microcontroller. When the mobile APP control end gives an unlocking instruction, the close-range wireless communicator will receive an unlocking signal, so that the lock controller connected with the microcontroller will control the lock actuator for an unlocking action.

In this application, the close-range wireless communicator is connected to and receives wireless data from the mobile APP control end via the microcontroller and close-range wireless communicator. When the mobile APP control end gives an unlocking instruction and the close-range wireless communicator receives the unlocking signal, the lock controller connected with the microcontroller will control the lock actuator for an unlocking action. It can transmit and send wireless data quickly, so that the bicycle can be unlocked quickly with a high success rate.

In this application, the close-range wireless communicator is designed for the receipt of unlocking signals from the mobile APP control end; the microcontroller is designed for controlling the communication of unlocking signals as well as action information of other modules; the mobile communication mobile is designed for communication; the lock controller is designed for controlling status information of the lock; and the lock actuator is designed for executing the unlocking.

In the above smart lock for shared-ride bicycle under mobile-APP-based control, the communication range of the above close-range wireless communicator is 10-20 cm.

In this application, as the communication distance of the close-range wireless communicator is 10-20 cm. When the user acts close to the bicycle, he can give an unlocking instruction for unlocking without executing scanning or any other procedures, which is more convenient.

In the above smart lock for shared-ride bicycle under mobile-APP-based control, a GPS locator is also connected with the microcontroller. The OPS locator is designed for locating the smart lock at any time. It can reflect the location of the bicycle, making it easier for the user to look for the bicycle and also for the administrators to manage and maintain their bicycles.

In the above smart lock for shared-ride bicycle under mobile-APP-based control, the mobile communication module includes a 2G communication module, a 3G communication module, a 4G communication module or a 5G communication module. Any such communication module is connected to a communication antenna.

In the above smart lock for shared-ride bicycle under mobile-APP-based control, the smart lock body also includes a power supply. The power supply is electronically connected to one or more than one among the microcontroller, the communication module, the lock controller, the lock actuator and the UPS locator.

In the above smart lock for shared-ride bicycle under mobile-APP-based control, the 3G communication module is any of WCDMA, CDMA2000, TD-SCDMA, EVEDO, HSPA or HSPA+.

This smart lock for shared-ride bicycle control system under mobile-APP-based control includes a smart lock for shared-ride bicycle and a mobile APP control end. The smart lock for shared-ride bicycle is connected to the mobile communication module via wireless communication, and the mobile APP control end is connected to the 2G/3G/4G/5G mobile communication network via wireless communication. This system also includes a cloud server connected to the mobile communication module and the 2G/3G/4G/5G mobile communication network. The smart lock for shared-ride bicycle is connected with the mobile APP control end via a close-range wireless communicator.

In this application, the 2G/3G/4G/5G mobile communication network is connected with the cloud server, and transmit information about the smart lock to the cloud server, such as the location, locking or unlocking status, time of locking or unlocking and cell voltage of the smart lock. Thus, an instruction can be received on the cloud server and an Internet of Things for the smart lock can be formed, which makes it easier for use and management.

In the above smart lock for shared-ride bicycle control system under mobile-APP-based control, the smart lock for shared-ride bicycle includes a smart lock body. The smart lock body includes a microcontroller. There is a close-range wireless communicator connected with the microcontroller, and such close-range wireless communicator is connected to the mobile APP control end via wire communication. There is also a mobile communication module, a lock controller and a lock actuator connected with the microcontroller. When the mobile APP control end gives an unlocking instruction, the close-range wireless communicator will receive the unlocking signal, so that the lock controller connected with the microcontroller can control the lock actuator for an unlocking action.

In the above smart lock for shared-ride bicycle control system under mobile-APP-based control, the microcontroller is also connected with a GPS locator.

In the above smart lock for shared-ride bicycle control system under mobile-APP-based control, the smart lock body also includes a power supply. The power supply is electronically connected to, one or more of the microcontroller, the mobile communication module, the lock controller, the took actuator and the GPS locator.

Compared to the existing technologies, this smart lock for shared-ride bicycle under mobile-APP-based control and its control system has the following advantages:

1. The close-range wireless communicator is connected with wireless data on the mobile APP control end via the microcontroller and the close-range wireless communicator. When the mobile APP control end gives an unlocking instruction, the close-range wireless communicator will receive the unlocking signal, so that the lock controller connected with the microcontroller will control the lock actuator for an unlocking action. It can transmit and data quickly via wireless data, so that the bicycle can be unlocked quickly and stably with a high success rate.

2. No QR code scanning is required, so that the unlocking is more secure.

Specific Embodiment Methods

This utility mode is further described in detail according to the attached figures and the specific mode of execution.

As is shown in FIG. 1, this utility model provides a kind of smart lock for shared-ride bicycle under mobile-APP-based control. The smart lock includes the smart lock body 1. The user uses a mobile APP to control the unlocking of the smart lock for shared-ride bicycle body. Compared to traditional ways to unlock a smart lock, such smart lock does not require the scanning of a QR code, the swiping of an IC card or unlocking with a key.

Figure 2:
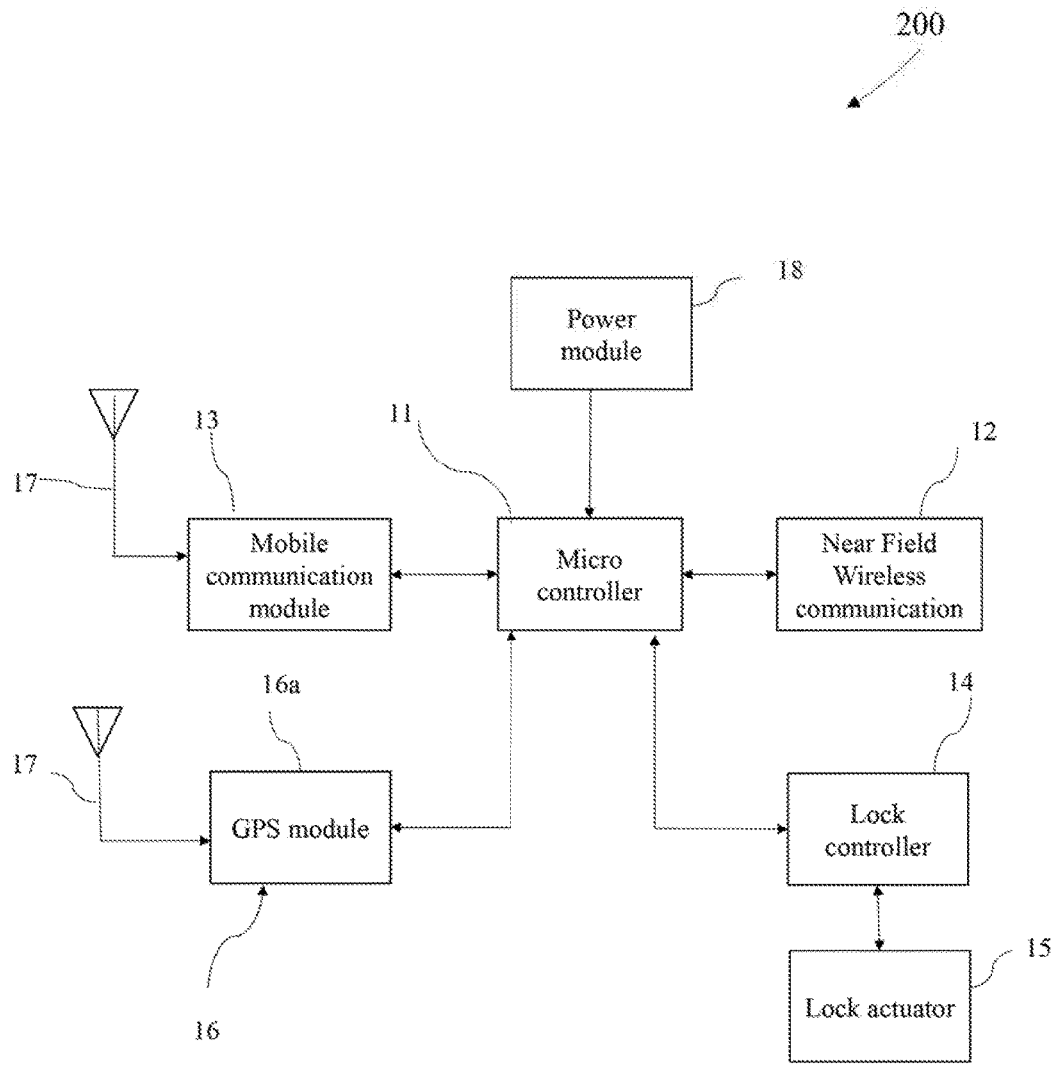
FIG. 2 is a module frame diagram for the smart lock body provide by this utility model.

As is shown in FIG. 2, in this embodiment, the smart lock body 1 includes the microcontroller 11. The microcontroller 11 is connected to the close-range wireless communicator 12, and the close-range wireless communicator 12 is connected to the mobile APP control end 2 via wireless communication. There are also the mobile communication module 13, the lock controller 14 and the lock actuator 15 connected with the microcontroller 11. When the mobile APP control end gives an unlocking instruction, the close-range wireless communicator 12 will receives an unlocking signal, so that the lock controller 14 connected with the microcontroller 11 to control the lock actuator 15 for unlocking.

Course of action of the unlocking of such smart lock. The mobile APP control end 2 sends out an unlocking signal. The close-range wireless communicator 12 receives the unlocking signal sent out by the mobile APP control end 2 via the mobile communication module 13. The mobile communication module 13 transmits the unlocking signal to the microcontroller 11. The microcontroller 11 transmits status information about the smart lock body 1 to the mobile APP software, such as the locking or unlocking status, time of locking or unlocking and cell voltage of the smart lock, for the exchange of data information. The microcontroller 11 transmits the unlocking signal to the lock controller 14, and the lock controller 14 receives the unlocking signal and transmits the status information of the smart lock body to the microcontroller 11, realizing the data information exchange between the microcontroller 11 and the lock controller 14. The lock controller 14 then transmits the unlocking signal to the lock actuator 15, and the lock actuator 15 executes the unlocking action and transmits the status information about the smart lock body to the lock controller 14. According to the course of action of the unlocking of the smart lock, data from each part of the smart lock body 1 are transmitted by means of mutual exchange, and the unlocking signal is transmitted via wireless communication. Thus, the unlocking is quick and stable with a high success rate. Compared to unlocking through QR code scanning, this method is quicker and easier.

Furthermore, the communication range of the close-range wireless communicator 12 is 10-20 cm. When the user gets close to the bicycle for unlocking, he can send an unlocking instruction via the mobile APP control end to realize unlocking without scanning or any other procedures, it is quicker and easier, and thus can improve user experience. The mobile communication module 13 is a 2G communication module, a 3G communication module, a 4G communication module or a 5G communication module. In this case, the 3G communication module is any of WCDMA, CDMA2000, TD-SCDMA, EVEDO, HSPA or HSPA+. The communication antenna 17 is connected with the 2G communication module, 3G communication module, 4G communication module or 5G communication module. The communication antenna 17 is designed for the receipt and transmission of unlocking information sent from the mobile APP control end 2. Besides, the smart lock body 1 also includes a power supply 18. The power supply 18 is designed for supplying power to one or more than one among the microcontroller 11, the mobile communication module 13, the lock controller 14 and the lock actuator 15.

Secondly, in this embodiment, the microcontroller 11 is also connected to the GPS locator 16. The GPS locator 16 includes the GPS module 16a. The GPS module 16a is also connected to the communication antenna 17. The communication antenna 17 is designed for the receipt of GPS satellite signals and the transmission of the GPS satellite signals to the GPS module 16a. The GPS module 16a then gets the location data. The microcontroller 11 and the GPS locator 16 exchange data with each other, so as to get the real-time location of the smart lock.

In this embodiment, the microcontroller 11, the close-range wireless communicator 12 the mobile communication module 13, the lock controller 14, the lock actuator 15, the GPS module 16a, the cloud server 5 and other module are existing technologies; thus, their circuit diagrams or the specific operating structure chart are not further specified herein.

Figure 3:
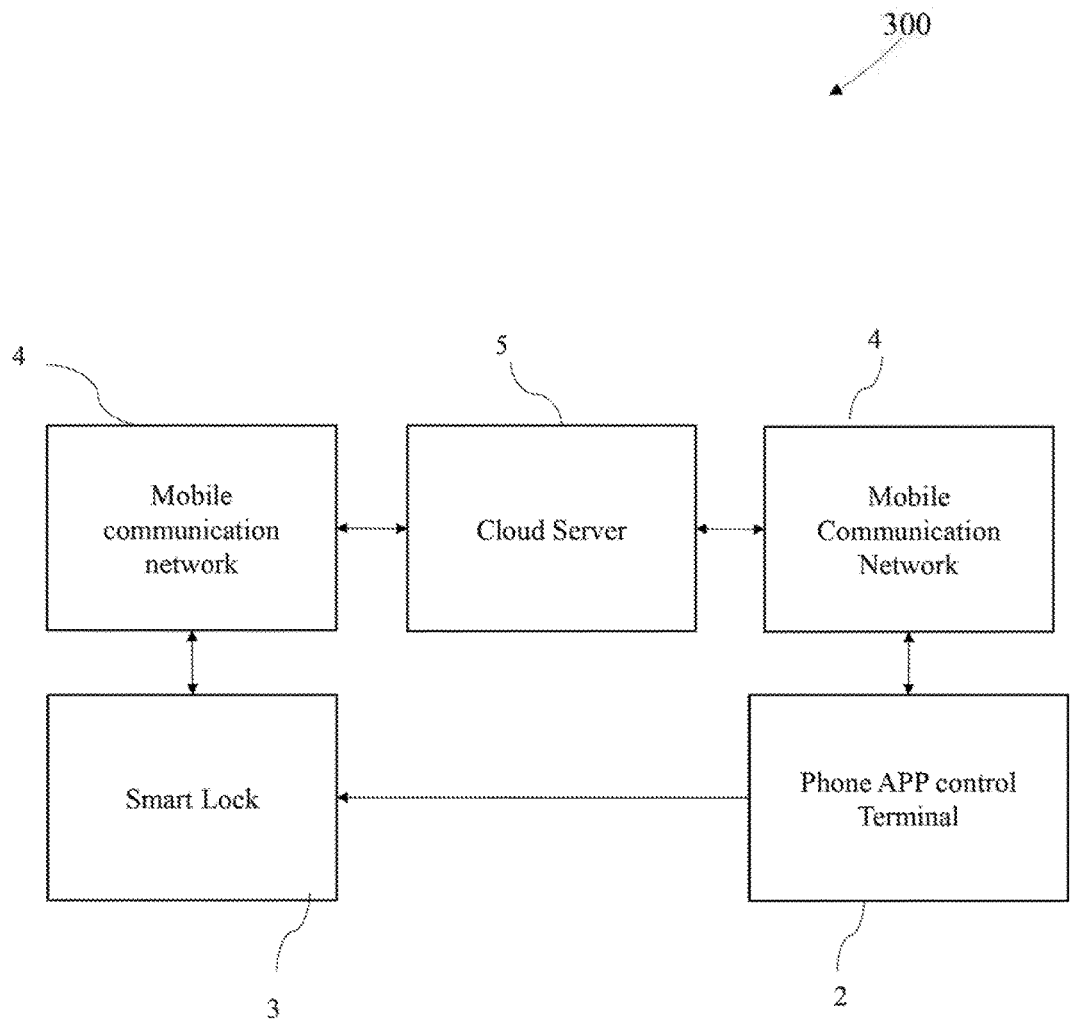
FIG. 3 is a system frame diagram of the smart lock control system provided by this utility model, In the figures, "1" represents the smart-lock body, "11" represents the microcontroller, "12" represents the close-range wireless communicator, "13" represents the mobile communication module, "14" represents the lock controller, "15" represents the lock actuator, "16" represents the GPS locator, "16*a*" represents the GPS module, "17" represents the communication antenna, "18" represents the power supply, "2" represents the mobile APP control end, "3" represents the smart lock, "4" represents the mobile communication network, and "5" represents the cloud server.

As is shown in FIG. 3, this utility model also provides a kind of smart lock for shared-ride bicycle control system under mobile-APP-based control. This system includes the smart lock for shared-ride bicycle 3 and the mobile APP control end 2. The smart lock for shared-ride bicycle 3 is connected with the mobile communication module 13 via wireless communication. The mobile APP control end 2 is connected to the 2G/3G/4G/5G mobile communication network 4 via wireless communication. This system also includes the cloud server 5 that is connected to the mobile communication module 13 and the 2G/3G/4G/5G mobile communication network 4. The smart lock for shared-ride bicycle 3 is connected to the mobile APP control end 2 via the close-range wireless communicator 12. The cloud server 5 is designed for the restoration of the location, locking or unlocking status, time of locking or unlocking and cell battery of the smart lock uploaded to the cloud server, so as to receive instructions on the cloud server and form a system of the Internet of Things for the smart lock. It is easier for use and management.

The specific embodiment described herein is just an example for the essence of this utility model. Technicians from the technical field of this utility model may modify, supplement or otherwise replace this specific embodiment with similar methods described hereunder within the essence of this utility model or the scope defined under the claims attached.

Though terms such as the smart lock body 1, the microcontroller 11, the close-range wireless communicator 12, the mobile communication module 13, the lock controller 14, the lock actuator 15, the GPS locator 16, the GPS module 16a, the communication antenna 17, the power supply 18, the mobile APP control end 2, the smart lock, the mobile communication network 4, the cloud server 5, etc. are widely used herein, other terms may also be used. The use of these terms is only for the purpose of describing and explaining the nature of this utility model in an easier manner; it is a violation against the spirit of this utility model if the terms are interpreted as any kind of additional restrictions.

Although exemplary examples the method of the present disclosure have been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims.

The above examples are for illustrative purposes and are not intended to limit the scope of the disclosure or the adaptation of the features described herein to particular components. Those skilled in the art will also appreciate that various adaptations and modifications of the above-described preferred examples may be configured without departing from the scope and spirit of the disclosure. Therefore, it is to be understood that, within the scope of the appended claims, the disclosure may be practiced by examples in addition to those specifically described.

What is claimed is:

1. A smart lock for shared-ride bicycles, comprising:
   a smart lock body;
   a microcontroller coupled to the smart lock body;
   a close-range wireless communicator providing near field wireless communication having a wireless module, the close-range wireless communicator is coupled to the microcontroller, wherein the close-range wireless communicator communicates with a mobile application (APP) control end via the wireless module in close-range;
   a mobile communication module coupled to the microcontroller;
   a lock controller coupled to the microcontroller, wherein the lock controller communicates data through the mobile application control end in close-range; and
   a lock actuator coupled to the microcontroller, wherein when the mobile application (APP) control end gives an unlocking instruction, the close-range wireless communicator receives an unlocking signal via near field wireless communication, and the lock controller controls the lock actuator, unlocking the smart lock body.

2. The smart lock for shared-ride bicycles of claim 1 wherein, a range of the close-range wireless communicator is 10-20 cm.

3. The smart lock for shared-ride bicycles of claim 1 further comprising a GPS locator connected to the microcontroller.

4. The smart lock for shared-ride tricycles of claim 1 wherein, the mobile communication module is one or more of 2G communication module, 3G communication module and 4G communication module, which is connected with a module antenna.

5. The smart lock for shared-ride bicycles of claim 3 further comprising, a power supply coupled to the smart lock body wherein the power supply is electronically connected to one or more of the microcontroller, the mobile communication module, the lock controller, the lock actuator and the GPS locator.

6. The smart lock for shared-ride bicycles of claim 4 wherein the 3G communication module is one or more of WCDMA, CDMA2000, TD-SCDMA, EVEDO, HSPA and HSPA+.

7. A mobile-application (APP)-based control system for a shared-ride bicycle, comprising:
   a smart lock for the shared-ride bicycle;
   a mobile communication module connected to the smart lock via a wireless module;
   a mobile application (APP) control end connected via the wireless module to one or more of a 2G, 3G, 4G and 5G mobile module network;
   a cloud server connected to the mobile communication module and the mobile module network; and
   a close-range wireless communicator providing near field wireless communication coupling the smart lock to the mobile application (APP), wherein the smart lock communicates data through the mobile application control end in close-range.

8. The mobile-application (APP)-based control system for the shared-ride bicycle of claim 7 further comprising:
   a smart lock body;
   a microcontroller coupled to the smart lock body; and
   wherein the wireless module connects the close-range wireless communicator to the mobile application (APP) control end;
   wherein the microcontroller is connected to the mobile communication module, a lock controller, a lock actuator and the close range wireless communicator providing near field wireless communication; and
   wherein when the mobile application (APP) control end gives an unlocking instruction, the close-range wireless communicator receives an unlocking signal via the near field wireless communication, and the lock controller controls the lock actuator, unlocking the smart lock body.

9. The mobile-application (APP)-based control system for the shared-ride bicycle of claim 8 further comprising a GPS locator connected to the microcontroller.

10. The mobile-application (APP)-based control system for the shared-ride bicycle of claim 8 further comprising a power supply connected to the smart lock body, wherein the power supply is electronically connected with one or more of the microcontroller, the mobile communication module, the lock controller, the lock actuator and a GPS locator.

* * * * *